United States Patent [19]
Palusamy et al.

[11] Patent Number: 5,157,619
[45] Date of Patent: Oct. 20, 1992

[54] ABNORMAL THERMAL LOADING EFFECTS MONITORING SYSTEM

[75] Inventors: Sam S. Palusamy, Murrysville; Charles B. Bond, Plum Boro; David H. Roarty, Murrysville, all of Pa.

[73] Assignee: Westinghouse Electric Corp., Pittsburgh, Pa.

[21] Appl. No.: 506,487

[22] Filed: Apr. 6, 1990

Related U.S. Application Data

[63] Continuation of Ser. No. 264,609, Oct. 31, 1988, abandoned.

[51] Int. Cl.⁵ .................... G06F 15/74; G01N 25/00
[52] U.S. Cl. .................... 364/508; 364/557; 374/137
[58] Field of Search ........... 364/507, 508, 557, 509; 340/665, 679; 73/766, 767, 768; 374/57, 101, 102, 141, 147, 152, 137, 4, 15, 30, 47

[56] References Cited

U.S. PATENT DOCUMENTS

| | | | |
|---|---|---|---|
| 2,976,523 | 3/1961 | Duffy | 340/231 |
| 3,955,359 | 5/1976 | Yannone et al. | 60/39.28 T |
| 4,324,138 | 4/1982 | Davis et al. | 73/341 |
| 4,384,793 | 5/1983 | O'Brien et al. | 374/115 |
| 4,440,509 | 4/1984 | Agarwal | 374/137 X |
| 4,483,631 | 11/1984 | Kydd | 374/141 |
| 4,558,227 | 12/1985 | Yanada et al. | 290/40 R |
| 4,655,041 | 4/1987 | Del Vecchio et al. | 60/646 |
| 4,722,062 | 1/1988 | Breitkopf et al. | 364/508 |
| 4,764,882 | 8/1988 | Braschel et al. | 364/508 |
| 4,792,912 | 12/1988 | Kuramoto et al. | 364/557 |
| 4,839,830 | 6/1989 | Amey et al. | 364/508 |
| 4,896,281 | 1/1990 | Mack | 364/557 |
| 4,907,177 | 3/1990 | Curreri et al. | 364/557 |
| 4,908,775 | 3/1990 | Palusamy et al. | 364/508 |

FOREIGN PATENT DOCUMENTS

| | | |
|---|---|---|
| 67667 | 10/1975 | Australia. |
| 0280489 | 8/1988 | European Pat. Off.. |

OTHER PUBLICATIONS

*ASME Boiler and Pressure Vessel Code*, "Rules for Construction of Nuclear Power Plant Components", American Society of Mechanical Engineers (ASME), Jul. 1, 1986, 1986 Edition, Section BB-3222.4, p. 63.

Shigley, J., *Mechanical Engineering Design*, Third Ed., pp. 185-190, 1977.

*Primary Examiner*—Parshotam S. Lall
*Assistant Examiner*—Michael J. Zanelli

[57] ABSTRACT

Temperature transducers are mounted on the outside surface of a containment system such as a pipe to detect thermal stratification and fluctuations thereof. The transducers are mounted in an arc lying in a plane perpendicular to the flow direction in the system at each of several positions separated along the flow direction. The data obtained by the temperature transducers is supplied to a computer for calculation of stress using transfer functions summing changes in both temperature and position over time. The stress due to abnormal thermal loads is combined with other stress on the system so that fatigue usage and fatigue crack growth can be calculated.

19 Claims, 4 Drawing Sheets

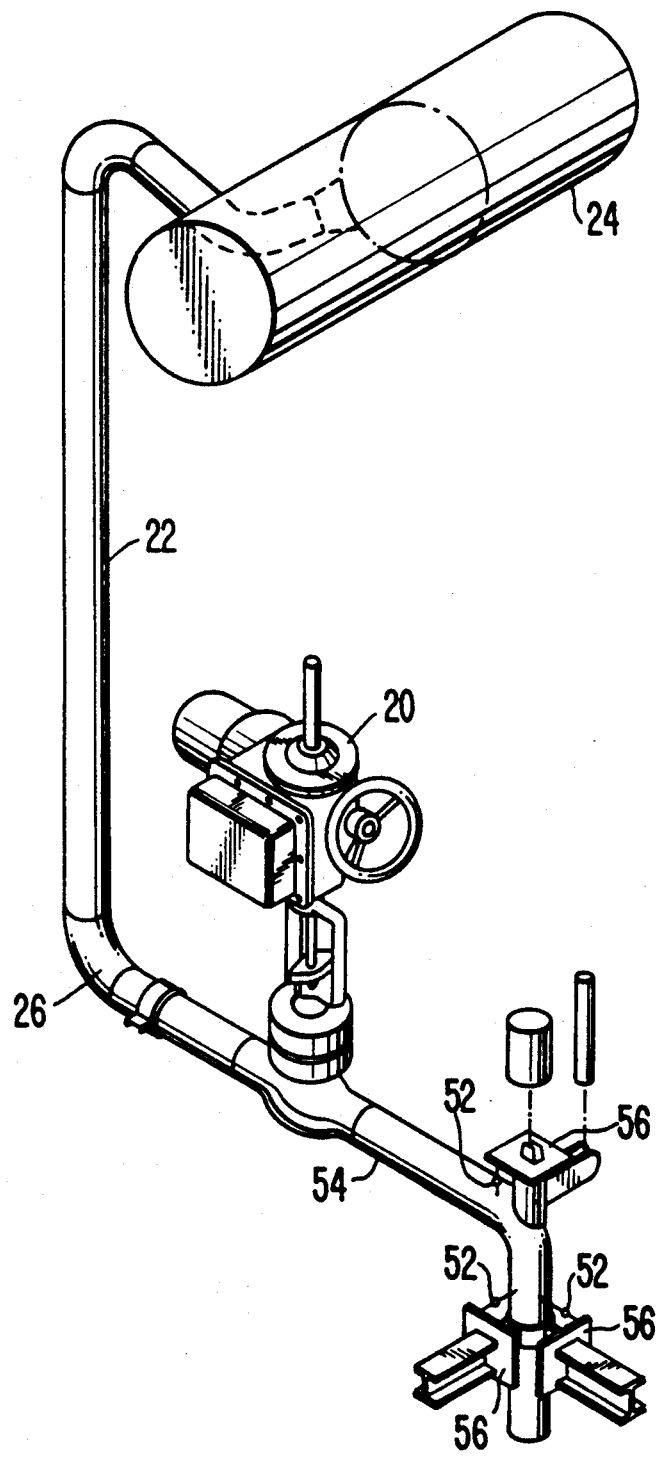

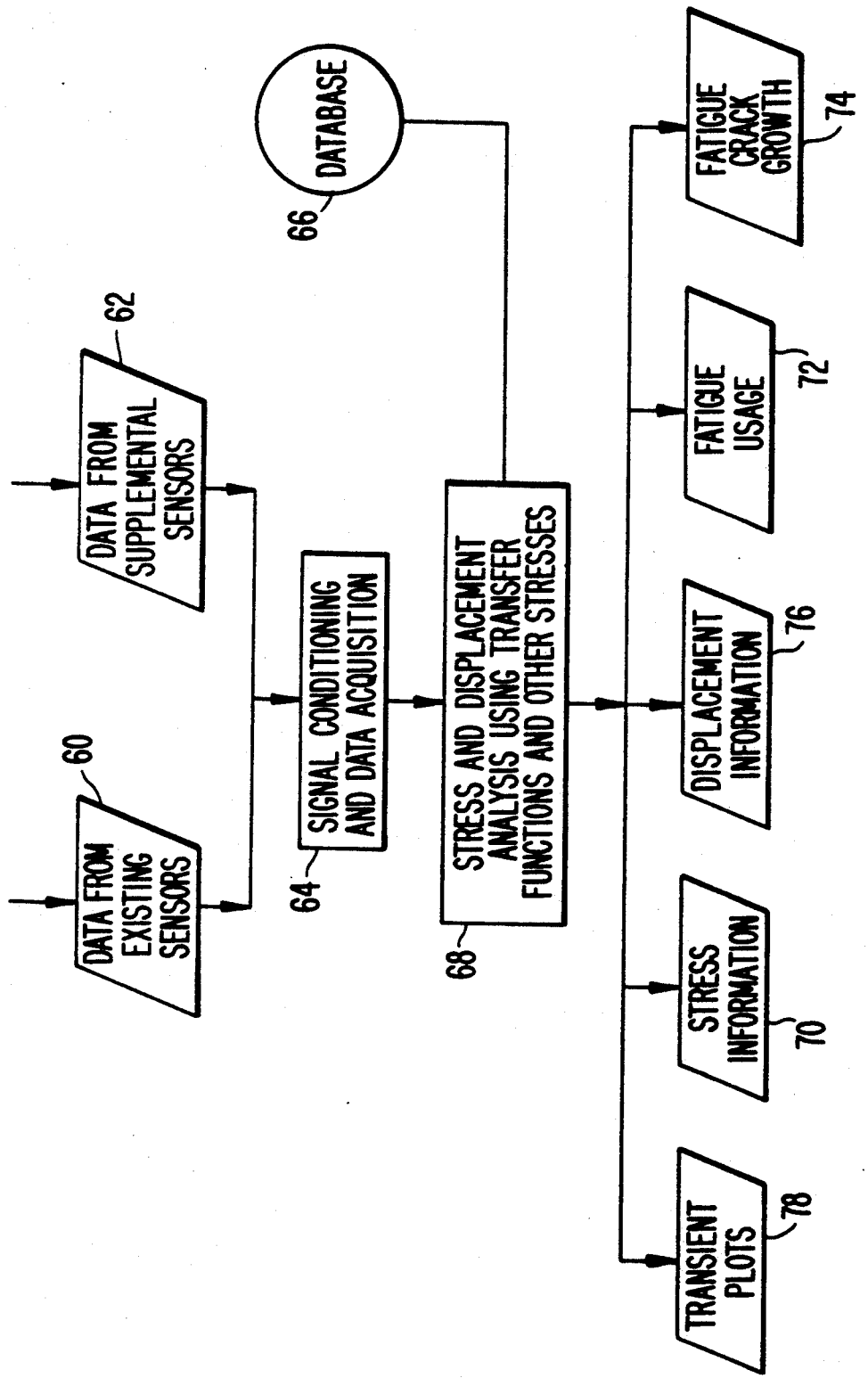

ABNORMAL THERMAL LOADING EFFECTS MONITORING SYSTEM

This application is a continuation of application Ser. No. 07/264,609 filed Oct. 31, 1988, now abandoned.

BACKGROUND OF THE INVENTION

1. Field of the Invention

The present invention is related to thermal monitoring and stress calculation for a containing system and, more particularly, to a method and apparatus for calculating stress caused by time dependent, spatially distributed thermal loads in a system such as a steam supply system in a pressurized water nuclear reactor.

2. Description of the Related Art

Cooling systems typically include a piping network or system of pipes including valves, headers and other junctions. Temperature fluctuations of the fluid contained by such systems produce thermal loads which cause stress on the system. In systems which maintain the pressure boundary in nuclear reactors used for electrical power generation, monitoring systems are used to detect thermal loads on the system. U.S. Pat. Application Ser. No. 07/018,379 filed Feb. 24, 1987, is one example of a system for monitoring thermal loads and calculating the stresses caused by the thermal loads. The system disclosed in the '379 Application is particularly directed to monitoring changes in thermal loads on an entire pipe or other component and calculating fatigue accumulation from the cyclical changes in thermal loads. Other conventional thermal load monitoring systems are more simplistic and generally do not go beyond recording temperature at a single point for each pipe or other component which is monitored.

Under certain conditions of low or no flow, the fluid in a containment system can become stratified with sharply different temperature levels. While the stratification itself creates an abnormally high thermal bending load due to the sharp change in temperature at the interface between the regions of different temperatures, the stress is increased when the interface between layers oscillates rapidly in a small band about some mean level. Such fluctuation is termed thermal striping. The stress on the system also changes when the global interface level varies up and down the cross section of the pipe. When such changes in the location of the interface are repeated, the load is considered thermocyclic.

The stress on the system also changes when the global interface level varies up and down the cross-section of the pipe. None of the existing monitoring systems make any attempt to detect the existence of stratification layers in containment systems or to calculate the stress caused by such stratification.

SUMMARY OF THE INVENTION

An object of the present invention is to detect abnormal thermal loads in a power plant.

Another object of the present invention is to calculate stress caused by abnormal thermal loads.

A further object of the present invention is to calculate fatigue usage or fatigue crack growth from stress caused by abnormal thermal loads and other sources.

A yet further object of the present invention is to provide predictive maintenance information based upon fatigue accumulation of a system due to stress caused by abnormal thermal loads and other loads.

The above objects are attained by providing a method for determining stress caused by thermal loads in a system containing fluid, the method comprising the steps of detecting a spa distribution of fluid temperature for at least one position within the system and calculating stress on the system in dependence upon the spatial distribution of temperature for the at least one position. Preferably, these steps are repeated periodically during operation of the system and other stresses on the system are also calculated. Thus, it is possible to calculate fatigue usage and fatigue crack growth in the system.

According to the preferred embodiment, a plurality of positions where abnormal thermal loads are likely to occur are identified. At each of the positions, temperature sensors are mounted at points on the surface of pressure retaining components, such as pipes. The points are preferably substantially equally spaced around a cross-sectional plane which is substantially perpendicular to the flow direction of the fluid contained by the component.

These objects, together with other objects and advantages which will be subsequently apparent, reside in the details of construction and operation as more fully hereinafter described and claimed, reference being had to the accompanying drawings, forming a part hereof, wherein like reference numerals refer to like parts throughout.

BRIEF DESCRIPTION OF THE DRAWINGS

FIG. 2 is a perspective view of a second configuration of a main pipe and branch pipe;

FIG. 5 is a flowchart of a monitoring system according to the present invention;

FIG. 6 is a block diagram of a monitoring system according to the present invention.

DESCRIPTION OF THE PREFERRED EMBODIMENTS

Figure 1A:
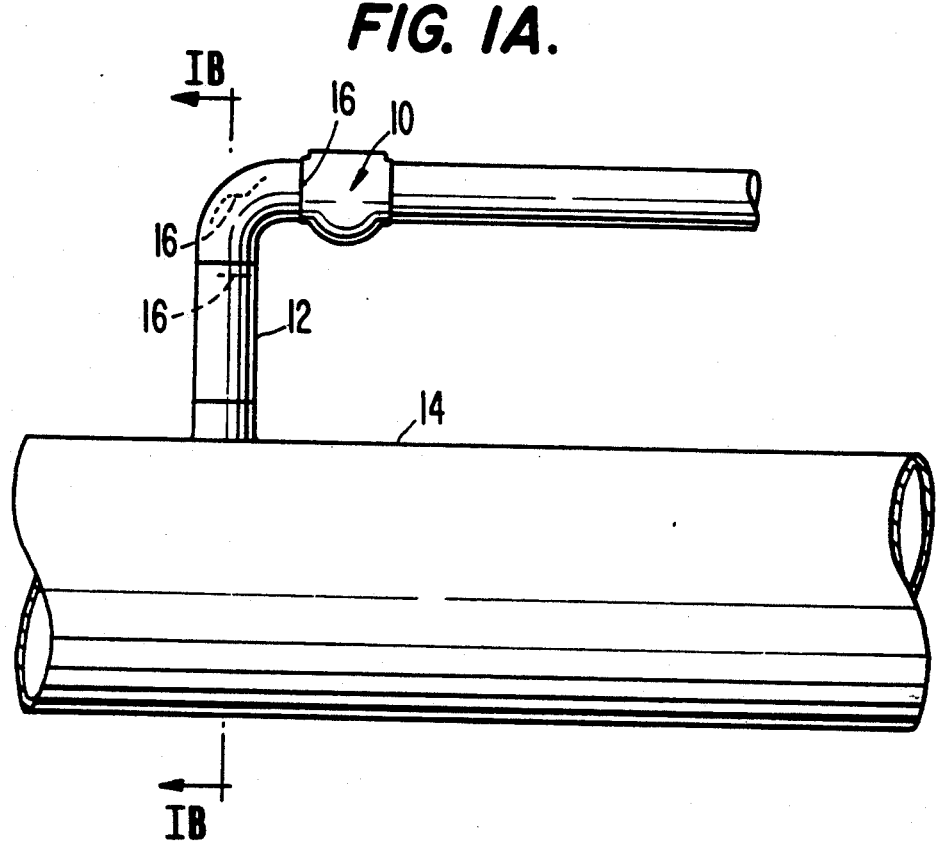
FIG. 1A is a longitudinal cross-sectional view of a first configuration of a main pipe and a branch pipe.

During no and low flow conditions, certain pipe configurations can be subjected to abnormal thermal loads resulting in increased stress at certain critical locations. FIGS. 1A, 1B, 2 and 3 illustrate some typical pipe configurations which can be subjected to such abnormal thermal loads. In FIG. 1A, when a valve 10 is closed and sealed or slightly leaking, a branch pipe 12 between the valve 10 and a main pipe 14 is likely to contain fluid having stratified temperature levels. The stratification of the fluid, e.g., water or steam, in the branch pipe 12 causes abnormal thermal loads at critical locations 16. These thermal loads are caused by the sharp temperature differential between the stratified layers of fluid in the branch pipe 12. As the position of the interface between layers changes, relative to the walls of the branch pipe 12 over a narrow range, thermal striping occurs at or near the critical locations 16. If the level changes are more widely dispersed and repeated, thermocyclical loads on the branch pipe 12 will occur at or near the critical locations 16.

Similar thermal loads may exist in the pipe configuration illustrated in FIG. 2. When valve 20 is closed, the fluid in branch pipe 22 which flows from main pipe 24 may become stagnant causing abnormal thermal loads at critical location 26.

Figure 1B:
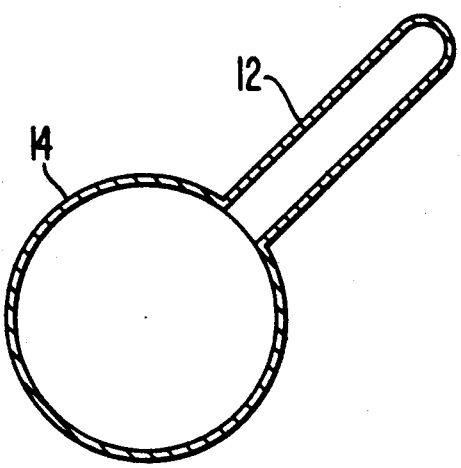
FIG. 1B is a transverse cross-sectional view of the first configuration of main pipe and branch pipe.

Stratification causing thermal loads may result from many different configurations and critical locations are not always as easily identified as in the configurations of FIGS. 1A, 1B and 2. For example, in the configuration illustrated in FIG. 3, a system pressure control tank 30 is connected via a branch pipe 32 to a main pipe 34. A nozzle 36 connects the branch pipe 32 and the main pipe 34. Provided the pressure in the main pipe 34 is constant and all joints are sealed, there is low flow through the branch pipe 32. Typically, the fluid in the system pressure control tank 30 is hotter than that in the main pipe 34, as indicated by the shading. The hotter fluid 38 and cooler fluid 40 becomes stratified in the branch pipe 32.

As the pressure in the main pipe 34 increases, an increased amount of cooler fluid 40 flows into the branch pipe 32 bringing the interface 42 between the hotter 38 and cooler 40 fluids closer to the system pressure control tank 30. As the pressure in the main pipe 34 decreases, the interface 42 moves closer to the nozzle 36. As a result, essentially the entire branch pipe 32 is a critical location and thus the amount of instrumentation required for detecting the abnormal thermal loads on the branch pipe 32 is likely to be greater than that on branch pipes 12 and 22 in FIGS. 1A, 1B and 2.

Since the monitoring system according to the present invention is directed to thermal loads, the primary sensors used in the monitoring system measure temperature. For example, a 100 ohm platinum resistive temperature detector (RTD), such as an RTD-392 from Hy-Cla Engineering, may be used to detect temperature at each of a plurality of points on the surface of a containment system such as pipe 32. To ensure that the temperature sensors are able to detect fluctuations in the interface 42, RTDs may be arranged as illustrated in FIG. 4A with the points equally spaced on an arc around the pipe and the chord between the ends of the arcs being substantially parallel to a vector indicating net gravitational force.

Figure 4B:
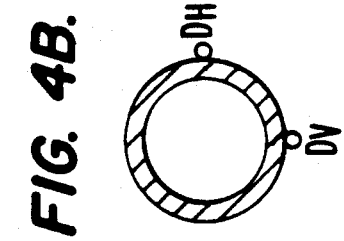
FIGS. 4A and 4B are transverse cross-sectional diagrams of the branch pipe in FIG. 3 illustrating two sensor arrangement.
Figure 4A:
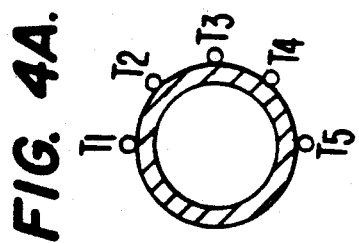

In the example illustrated in FIG. 4A, one end of the arc is at temperature detector $T_1$ at the "top" of the pipe and the other end of the arc is located at temperature detector $T_5$ at the "bottom" of the pipe. Temperature detectors $T_2$, $T_3$ and $T_4$ are arranged on one side of the pipe between temperature detectors $T_1$ and $T_5$. In the case of a pipe, such as pipe 32, which is substantially horizontal, the arc defined by the temperature detectors $T_1$–$T_5$ may define a plane substantially perpendicular to the flow direction and the temperature detectors $T_1$ and $T_5$ may be diametrically opposed points on the surface of the pipe.

Depending upon the sensitivity of the temperature detectors, the way in which temperature is transmitted via the walls of the pipe, the rate of fluctuation within the pipe and the location of the interface 42 between the hotter 38 and colder 40 fluid, and other factors, fewer or additional temperature sensors may be used in the arc at each position. For example, three sensors arranged at the positions of temperature sensors $T_1$, $T_3$ and $T_5$ provide coverage for the entire pipe with less resolution than the five sensor system illustrated in FIG. 4A. If greater resolution is required, RTDs may be mounted equally spaced on the outside of the pipe, or, if the majority of the time the interface 42 is near, e.g., the top of the pipe, RTDs may be inserted between sensors $T_1$, $T_2$ and $T_3$ without inserting any additional RTDs between sensors $T_3$ and $T_5$. Other arrangements of additional RTDs may be used to emphasize detection in a particular region of interest.

Similarly, where detailed information is not required, a pair of temperature sensors at the top and bottom of the pipe (points $T_1$ and $T_5$ in FIG. 4A) will be able to detect changes in the temperature in the two layers of the fluid, while a single temperature sensor mounted at point $T_3$, which has a normal line passing therethrough that forms an angle of approximately 90° with the vector indicating net gravitational force, can detect when the interface 42 passes through the center of the pipe. Also, while platinum RTDs have been described as being used as the temperature sensors, other types of temperature sensors, such as thermocouples, may be used to detect spatial distribution of temperature at a position in the system.

Figure 3:
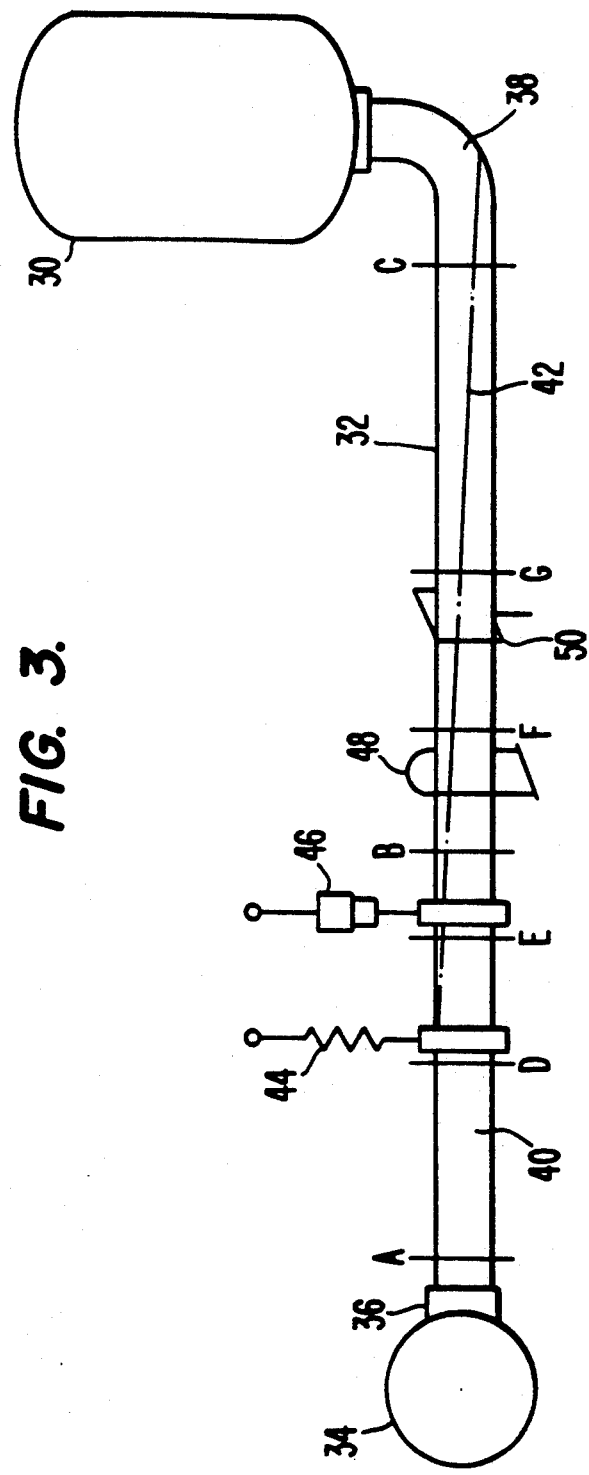
FIG. 3 is a schematic diagram of a third configuration of a main pipe and a branch pipe.

In a piping configuration such as that illustrated in FIG. 2 where a single critical location can be identified, it may be sufficient to obtain the spatial distribution of temperature at the single position, i.e., a cross-section of the pipe at the critical location 26. However, in the piping configuration illustrated in FIG. 3, it is desirable to detect temperature for at least two positions separated in the flow direction. In FIG. 3, the flow direction is between the system pressure control tank 30 and main pipe 34. Thus, it is useful to detect the spatial distribution of temperature at, e.g., three positions A, B and C along the pipe 32. At each of these positions, the temperature is detected at a plurality of points defining a plane substantially perpendicular to the flow direction. In other words, the temperature is detected at points along an arc on the outside surface of the pipe lying on a transverse cross-section as illustrated in FIG. 4A and described above.

The objective of detecting the spatial distribution of temperature at a variety of positions is to enable the monitoring system to calculate stress due to thermal loads. A computer can be programmed to calculate thermal stress from the spatial distribution of temperature by one of ordinary skill in the art. As described in U.S. Pat. Application Ser. No. 07/018,379, now U.S. Pat. No. 4,908,775 which is incorporated herein by reference, stress due to temperature changes can be calculated from equation (1) below, where $Q_{ij}$ is the stress response to the unit step function (f) and is called the kernel. The only difference will be in the spatial variation of temperature throughout the pipe cross section in the present case. Thus, for the present case, a series of integrals, like that in equation (1), would be developed for several locations of stratification interface, and these would be combined using an influence function superposition technique. This is a common technique for those skilled in the art. An example of how to apply this technique is contained in Y.C. Fung, *Foundations of Solid Mechanics*, Prentice Hall, Inc. Englewood Cliffs N.J., 1965 (Section 1.1), a reference describing a well-known technique in the art. Equation (1) is known as Duhamel's integral and due to the spatial distribution of temperature, summations must be taken with respect to both time and location to approximate the value of the integral.

$$\sigma_{ij}(x,y,t) = f(o)Q_{ij}(x,y,t) + \int \frac{df(t_1)}{dt_1} Q_{ij}(s,y,t-t_1)dt_1 \quad (1)$$

Using Duhamel's integral in the manner described in the '379 application and the references cited therein, one of ordinary skill in the art can program a computer to calculate stress on the system due to the spatial distribution of temperature for at least one position in the system as detected by the sensors described above. One of the primary causes of thermal stress is fluctuation in temperature and thus the temperature detection and stress calculations are repeatedly executed during operation of the system to properly calculate stress. The cyclical calculation of stress is described in detail in the '379 application and will not be described in detail here.

The particular method for timing of calculations described in the '379 application depends upon the detection of changes in temperature to determine when transients occur and to trigger the calculation of stress caused by the transients. A method according to the present invention may use such a triggering mechanism or may simply execute the steps of temperature detection and stress calculation periodically during operation of the system. When the calculations are triggered by transients, flow meters may be added to the system, e.g., at location A or C in FIG. 3 to trigger the calculations when flow is detected. In a piping configuration like that in FIG. 2, a leak sensor detecting leakage at valve 20 might similarly be used to begin periodic detection and calculation. Conventional flowmeters and leak sensors may be used in both cases.

In addition to detection of stratification levels in a containment system and calculation of the stress caused by such stratification levels, a major objective of the present invention is to calculate the total stress on the containment system, including abnormal thermal loads caused by stratification. In order to accomplish this objective, all other stresses on the containment system must be calculated. Therefore, additional sensors are mounted on, e.g., a pipe, to detect other stresses on the system. For example, displacement transducers such as LVDTs manufactured by Genisco Technology Corporation (e.g., model PT-10A-100G) may be mounted at points $D_H$ and $D_V$ in FIG. 4B at the positions indicated by D-G, corresponding to spring 44, snubber 46, rupture restraint 48 and rigid restraint 50. Similarly, in the piping configuration illustrated in FIG. 2, displacement transducers 52 may be mounted between pipe 54 and supports 56 to detect displacement along vectors parallel to three perpendicular axes.

Other analog and digital sensors which are typically provided at a nuclear power plant and at non-nuclear sites having other piping systems may provide data which can be used to calculate other stresses on the piping system. For example, pressure may be detected using conventional pressure sensors to detect the stress caused by pressure and pressure fluctuations. Accelerometers such as piezoelectrical accelerometer model 7701-100 manufactured by Endevco, may be used with signal conditioners, such as Unholtz-Dickie model 1112, to detect vibration of the pipe or other containment vessel. Other additional sensors may be added to detect conditions as required to calculate all known stresses on a system monitored by the present invention.

After the total stress on the system has been calculated, fatigue can be calculated using, for example, the technique described in the '379 application. Similarly, fatigue crack growth can be calculated using known techniques such as those described by Hertzberg in *Deformation and Fracture Mechanics of Engineering Materials*, John Wiley & Sons, 1976, a known reference in the art incorporated by reference into U.S. Pat. No. 4,908,775.

A diagrammatical representation of a method according to the present invention is provided by the flowchart in FIG. 5. Data 60 from existing sensors 61 and data 62 from supplemental sensors 63 undergo signal conditioning and data acquisition 64. As described in the '379 application, existing data acquisition equipment 65 supplemented with similar equipment can be used to obtain the data from the existing 61 and supplemental 63 sensors. Depending upon the number of critical locations desired to be monitored and the capacity of the existing data acquisition system, a sensor highway as described in U.S. Pat. No. 4,770,842, may be used to obtain the data from the supplemental 63 sensors.

The data acquired in step 64 is supplied together with information from a database 66 to stress and displacement analysis 68 using transfer functions and other previously calculated stresses The database 66 contains information on the sensors used, the system operation, the components monitored and the material properties. In addition, constants, tables and other information used in calculating stress is also stored in the database 66. The analysis step 68 performs the calculations of stress, fatigue usage and crack growth described above so that stress information 70, fatigue usage 72 and fatigue crack growth 74 can be output therefrom. In addition, displacement information 76 is output from the analysis step 68 based upon the data detected by the displacement transducers. In addition, analysis step 68 may include plotting routines which produce, e.g., transient plots 78.

As illustrated in FIG. 6, the apparatus used to execute the steps illustrated by the flowchart in FIG. 5 may be a mainframe, minicomputer or other computing apparatus 80 adequate to handle the amount of data supplied and the calculations to be performed. The computer 80 may be connected online to the signal conditioning and data acquisition system 65, or the data acquisition system 65 may provide records of the acquired data in, e.g., magnetic media which is in turn input to the computer 80 in an offline or batch process. In this alternative embodiment, a data logger, such as model 2280B/214 from John Fluke Manufacturing Co., may be used to collect the data 60 and 62 from the existing 61 and supplemental 63 sensors.

Using either an online or offline computer 80, the present invention may be applied to not only nuclear power plants but any process plant or individual components or systems subject to abnormal thermal loadings. Using the method described herein, stress due to thermal stratification, including thermal striping and thermocyclic loads, can be calculated and output on output unit 88.

The many features and advantages of the present invention are apparent from the detailed specification and thus, it is intended by the appended claims to cover all such features and advantages of the system which fall within the true spirit and scope of the invention. Further, since numerous modifications and changes will readily occur to those skilled in the art, it is not desired to limit the invention to the exact construction and operation illustrated and described. Accordingly, all suitable modifications and equivalents may be resorted to falling within the scope and spirit of the invention.

What is claimed is:

1. A method for determining stress caused by thermal loads in a system containing fluid, said method comprising the steps of:
   (a) detecting temperature data from a plurality of externally mounted temperature sensors to determine a spatial distribution of fluid temperature for at least one positional within the system, the externally mounted temperature sensors at each position defining a plane substantially perpendicular to the flow direction; and
   (b) calculating stress on the system in dependence upon the spatial distribution of fluid temperature for the at least one position.

2. The method as recited in claim 1, further comprising the step of (c) repeatedly executing steps (a) and (b) during operation of the system.

3. The method as recited in claim 2, further comprising the step of:
   (d) calculating other stresses on the system caused by at least one of pressure, vibration and gravity; and
   (e) calculating fatigue usage in the system in dependence upon said calculating in steps (b) and (d).

4. The method as recited in claim 1, further comprising the steps of:
   (c) calculating other stresses on the system caused by at least one of pressure, vibration and gravity; and
   (d) calculating fatigue crack growth within the system in dependence upon said calculating in steps (b) and (c).

5. The method as recited in claim 1, wherein the fluid flows in a flow direction, and
   wherein step (a) comprises detecting temperature for at least two positions separated in the flow direction.

6. The method as recited in claim 5, wherein step (a) further comprises detecting, at each of the positions, the temperature at two substantially diametrically opposed points on an exterior surface of the system.

7. The method as recited in claim 6, wherein the line connecting the two substantially diametrically opposed points is parallel to a vector indicating net gravitational force.

8. The method as recited in claim 5, wherein step (a) further comprises detecting, at each of the positions, the temperature of two points on a surface of the system, the two points defining a line parallel to a vector indicating net gravitational force.

9. The method as recited in claim 5, wherein step (b) comprises directly calculating the stress due to thermal stratification of the fluid based upon the spatial distribution of temperature detected in step (a).

10. The method as recited in claim 5, wherein step (b) comprises calculating the stress due to thermal striping based upon changes in the spatial distribution of temperature over time.

11. The method as recited in claim 5, wherein step (b) comprises calculating the stress due to thermocyclic loads based upon changes in the spatial distribution of temperature over time.

12. The method as recited in claim 5.,
   wherein the system includes a pipe having a surface, and
   wherein step (a) comprises detecting the temperature of a point on the surface of the pipe, a normal line passing through the point forming an angle of approximately 90° with a vector indicating net gravitational force.

13. The method as recited in claim 5, wherein the system includes a pipe having a surface and a substantially circular cross-section, and
   wherein step (a) further comprises detecting the temperature of at least three substantially equally spaced points lying on an arc on the surface of the pipe with the chord between the ends of the arc being substantially parallel to a vector indicating net gravitational force.

14. The method as recited in claim 13, wherein step (a) further comprises detecting, at each of the positions, the temperature of at least five substantially equally spaced points.

15. An apparatus for determining stress due to thermal loads in a system having inner and outer surfaces and containing a fluid, comprising:
   temperature detectors, mounted on the outer surface of the system, for detecting a spatial distribution of fluid temperature for at least one position within the system; and
   means for calculating stress on the system in dependence upon the spatial distribution of fluid temperature for the at least one position.

16. The apparatus as recited in claim 15,
   wherein said temperature detectors are mounted at a plurality of points on the outer surface of the system,
   wherein said calculating means repeatedly calculates the stress due to the spatial distribution of temperature detected by said temperature detectors, and
   wherein said apparatus further comprises means for outputting the stress calculated by said calculating means, including the stress caused by thermal stratification, thermal striping and thermocyclic loads when said temperature detectors detect the spatial distribution of temperature causing such stress.

17. An apparatus for monitoring stress due to thermal loads in pipes, comprising:
   temperature detectors mounted on exterior surfaces of the pipes for detecting temperature data indicative of temperature profiles for each of a plurality of cross-sections of the pipes;
   a data acquisition system, operatively connected to said temperature detectors, for obtaining the temperature data from said temperature detectors; and
   a computing system, operatively connected to said data acquisition system, for determining temperature differentials between the temperature profiles for a plurality of time periods to calculate stress due to thermal loads.

18. The apparatus as recited in claim 17, wherein the pipes contain fluid flowing in a flow direction,
   wherein said temperature detectors include first and second sensors groups, separated in the flow direction, detecting first and second temperature profiles, respectively, and
   wherein said computing system calculates the stress caused by thermocyclic loads based on changes in the first and second temperature profiles over time.

19. The apparatus as recited in claim 17, wherein the pipes have an axis,
   wherein said temperature detectors include first and second sensor groups, separated by a distance measured along the axis of one of the pipes, detecting first and second temperature profiles, respectively, each of the first and second sensor groups arranged in a plane substantially parallel to a vector indicating net gravitational force, and wherein said computing system calculates the stress caused by at least one of thermal stratification and thermal striping based on the first and second temperature profiles and changes in the first and second temperature profiles over time, respectively.

* * * * *